(12) United States Patent
Louwsma et al.

(10) Patent No.: US 8,253,781 B2
(45) Date of Patent: Aug. 28, 2012

(54) ASYMMETRIC VIEWING ANGLES FOR A DUAL VIEW DISPLAY

(75) Inventors: Hendrik Louwsma, Heerlen (NL); Ching-Wei Lin, Taoyuan (TW)

(73) Assignee: Chimei Innolux Corporation, Chu-Nan (TW)

( * ) Notice: Subject to any disclaimer, the term of this patent is extended or adjusted under 35 U.S.C. 154(b) by 1147 days.

(21) Appl. No.: 12/151,795

(22) Filed: May 8, 2008

(65) Prior Publication Data

US 2009/0091613 A1 Apr. 9, 2009

Related U.S. Application Data

(60) Provisional application No. 60/978,287, filed on Oct. 8, 2007.

(51) Int. Cl.
*H04N 9/47* (2006.01)
(52) U.S. Cl. .......................................... 348/51
(58) Field of Classification Search ...................... 348/51
See application file for complete search history.

(56) References Cited

FOREIGN PATENT DOCUMENTS

| EP | 1818905 | 8/2007 |
|---|---|---|
| GB | 2405546 | 3/2005 |

*Primary Examiner* — Adnan Mirza
(74) *Attorney, Agent, or Firm* — Liu & Liu (57) ABSTRACT

The present invention is related to an asymmetric aligned display having asymmetric viewing angles. The present invention provides a dual-view or 3D display capable of displaying two images of unrelated or related content along different directions with asymmetric viewing angles. The asymmetric viewing angles of the display device of the present invention can be realized by the introduction of multiple sub-pixel pitches into a single display. To be more specific, the present invention provides an asymmetric aligned display by realizing the asymmetry design in the sub-pixel itself. Consequently, the angular extends of the respective viewing windows or images displayed along different directions can be different or asymmetrical. The asymmetric aligned display of the present invention is, therefore, capable of displaying images along different directions with asymmetric viewing angles and windows without affecting the outer boundaries of the viewing windows.

15 Claims, 7 Drawing Sheets

ASYMMETRIC VIEWING ANGLES FOR A DUAL VIEW DISPLAY

This application claims the benefit of U.S. Provisional Application No. 60/978,287 filed Oct. 8, 2007.

FIELD OF THE INVENTION

The present invention relates to a dual-view and a three-dimensional ("3D") display device capable of generating multiple images.

BACKGROUND OF THE INVENTION

A conventional 3D display is capable of displaying a pair of stereoscopic images in different directions so that an observer can see each image in his or her respective eye. To allow the observer to receive the pair of image components to form an autostereoscopic view, the images are displayed in directions symmetrical to each other such that the left and right eye can receive its respective image simultaneously and symmetrically. The notion of a dual-view display is similar to a 3D display in that it can too simultaneously display two images in different directions on a single display panel. In principle, a dual-view display is different from a 3D display in that the images of a dual-view display can be of unrelated contents so that observers viewing from different locations, such as a right or left viewing window of the display, can perceive different visual images. For instance, in the application of a motor car display, the driver may be restricted to view navigation information shown on the left viewing window of the car display while the passenger may view another image content such as a movie on the right viewing window. Typically, the right and left viewing windows of the display are symmetrical in terms of their angular extends with respect to the normal of the display.

Figure 1:
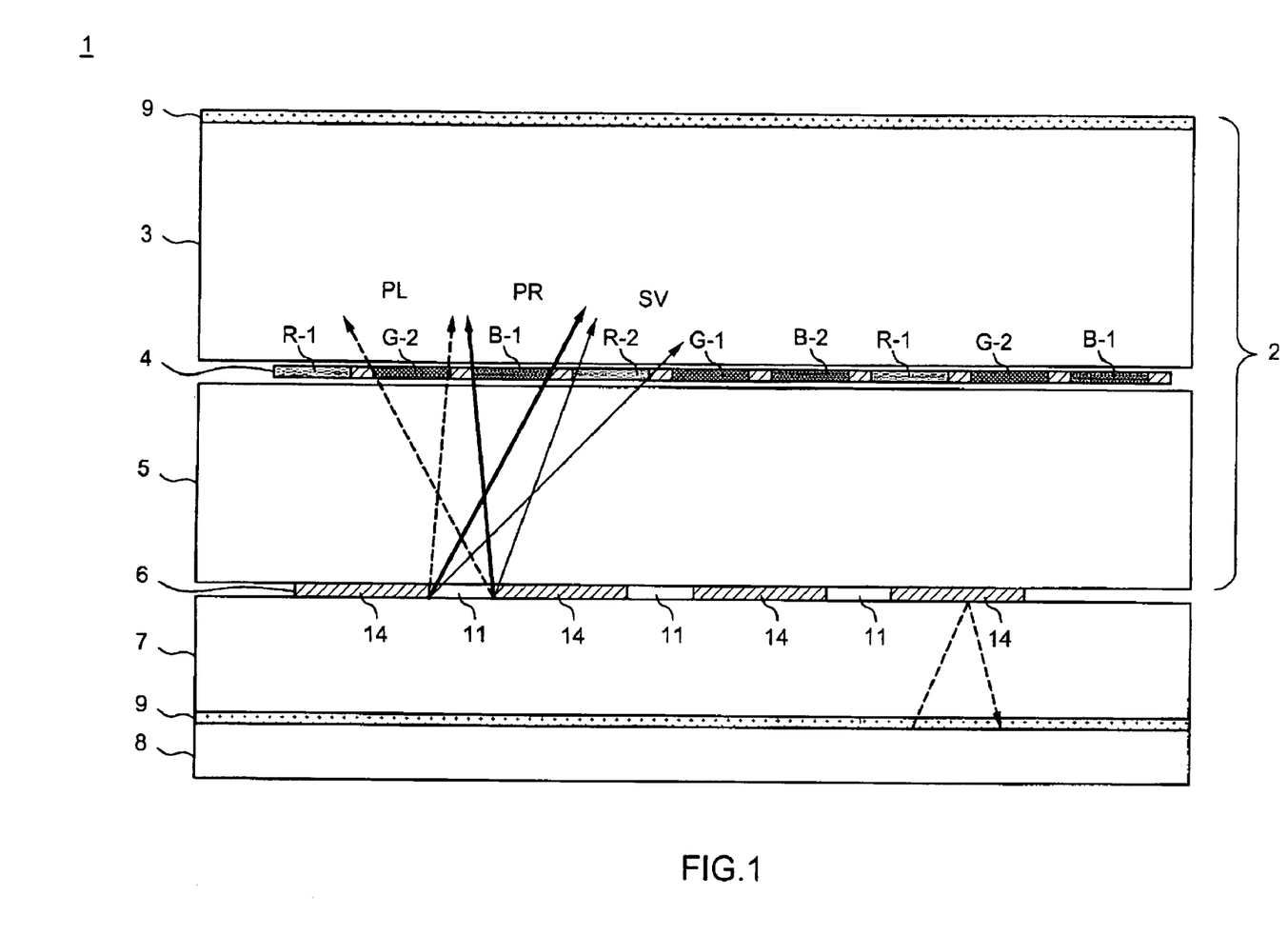
FIG. 1 shows a schematic cross sectional view of a conventional dual-view LCD display with symmetrical viewing angles.

FIG. 1 shows a schematic cross sectional view (not to scale) of a symmetrical dual-view LCD display device 1 based on a rear barrier 6 with opaque regions 14 being reflective on the side opposite to the backlight system 8. The dual-view LCD display device 1 comprises a display panel 2 including a color filter substrate 3 and a TFT liquid crystal substrate 5 with a pixellated color filter layer 4 interposed therebetween. The barrier 6 which lays upon a transparent barrier substrate 7 is provided on the rear side of the display panel 2 such that the backlight passes through transmissive regions 11 of the barrier 6 and then to the color filter layer 4. The front of the display panel and the rear end of the substrate may be further provided with a polarizer film 9. The barrier 6, in the embodiment shown, is applied at the rear side of the display panel 2 to generate dual views or a pair of autostereoscopic image components.

The display panel 2 includes the color filter layer 4 which comprises a plurality of pixels each having a number of sub-pixels. As shown in FIG. 1, a row of pixels having RGB sub-pixels (not to scale) is disclosed and each sub-pixel across the display panel, both in lateral rows or longitudinal columns, is assigned to either a primary right viewing window PR or a primary left viewing window PL. As shown in the figure, viewing window PR refers to the angular extend denoted by the dotted lines whereas the angular extend of viewing window PL is marked in solid lines. For ease of illustration, neither the unwanted secondary view SV indicated by thin solid lines nor the crosstalks will be further discussed in this paper. In the case of a 3D display, for example, the PR may coincide with the right-eye viewing window of an observer whereas PL may coincide with the left-eye viewing window such that an autostereoscopic view can be achieved. Likewise, for a dual-view display, the PR may refer to the right viewing window of an observer and the PL may be assigned to the left viewing window of another observer. The width of the views or the horizontal/vertical viewing angles of the display is limited by the thickness of the display panel 2, in particular the thickness of TFT liquid crystal substrate 5, which defines the distance between the barrier 6 and the pixellated color filter layer 4.

Figure 2:
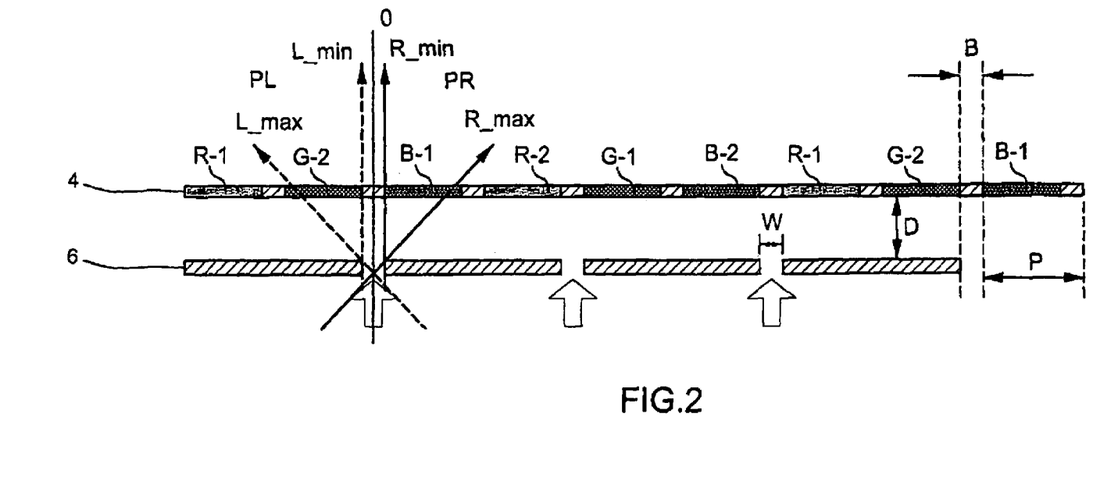
FIG. 2 shows a simplified schematic side view of the conventional dual-display/3D display of FIG. 1.

For the purpose of illustration, FIG. 2 shows a simplified schematic side view of a dual-display/3D display consisting of a color filter layer 4 with a plurality of sub-pixels and a barrier 6. The sub-pixels in a row of the pixel matrix are being alternatively assigned to either the PL or PR as R-1, G-2, B-1, R-2, G-1, B-2 etc, in which the symbols of -1 and -2 may refer to a left view sub-pixel associated with the PL and a right view sub-pixel associated with the PR, respectively. Taking G-2 and B-1 as examples, note that the areas or angular extends of G-2 and B-1 are symmetrical. This is typical for a dual-view/3D display wherein symmetrical views are displayed at substantially the same viewing angles with respect to the normal of the display panel. In other words, the angular extends of PL and PR are equal. As shown in the figure of a symmetrically aligned display, the left viewing window PL and its angular extend can be further defined by the angles L_max and L_min. Angle L_max refers to the angle between the imaginary normal 0 of the display and the maximum possible viewing angle of any one of the sub-pixels assigned to PL, for instance G-2 in this case, via the transmissive region 11 of the barrier 6. L_min is the minimum viewing angle of any of the sub-pixels assigned to PL with respect to the normal 0 via the barrier 6. Considering the images formed by the sub-pixels assigned to PL as a whole, the angular extend of PL is the angle between L_max and L_min. Similarly, PR can be indicated by angles R_min and R_max and the angular extend of PR is between R_max and R_min. Typically, the angles R_max and L_max are less than 90 degrees from the normal 0 due to the thickness of the display; and the angles are equal to each other to have symmetrical viewing windows PL and PR.

A dual view display having symmetrical views or viewing windows is not always suitable for all applications. For instance, in the case of a motor car dual display, having the driver's view zone being identical to that of the passenger's view zone may pose potential safety hazards because the driver can accidentally cross over the driver view zone or viewing window, which is no greater than that of the passenger's, to view the image content displayed in the passenger view zone. To prevent this from happening, a dual view display can be made to have asymmetrical viewing angles such that the view zones of the driver and the passenger are asymmetrical relative to each other.

Figure 3:
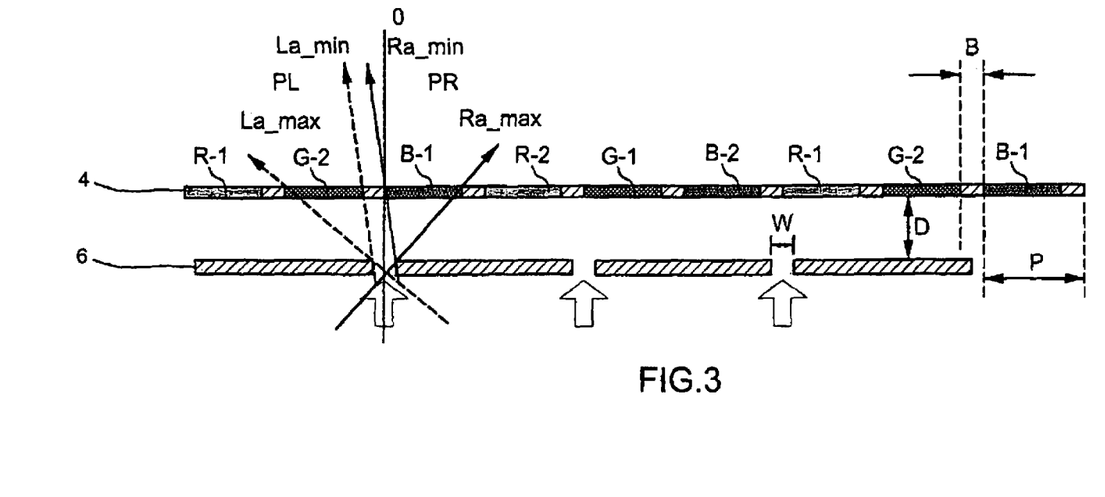
FIG. 3 shows a simplified schematic side view of an asymmetric aligned dual-view display realized by barrier shift.

One solution to the asymmetric dual view display is to provide a shift to the barrier with respect to the display panel such that the primary right viewing window PR and the primary left viewing window PL of the display are displaced such that the asymmetric viewing of PR and PL can be realized. FIG. 3 shows a simplified schematic side view of an asymmetric aligned dual-view display for which the asymmetry is realized by giving the barrier 6 a shift with respect to the (main) display comprising a pixellated color filter layer 4. By shifting the barrier 6 having transmissive regions 11 with a width W and a distance D relative to the sub-pixels (R-1, G-2, B-1, R-2, G-1, B-2 . . . ), the viewing window PL having angular extend between the angles of La_max and La_min can be made different from the viewing window PR with the angular extend defined by the angles of Ra_max and Ra_min.

As shown in FIG. 3, angle La_max is greater than angle L_max (FIG. 2) and angle Ra_max is smaller than angle R_max (FIG. 2). Consequently, La_max is larger than Ra_max, meaning that the outer viewing angles are different for the primary right viewing window PR and the primary left viewing window PL. In other words, different angular extends of PL and PR may be obtained by the shift of the barrier; however, all the viewing angles associated with the PL and PR may too become asymmetrical including the tilted outer boundaries of the viewing windows. This is a drawback of an asymmetric aligned display realized by barrier shifting.

SUMMARY OF THE INVENTION

In order to overcome the problems described above, one aspect of the present invention is to provide a dual-view/3D display capable of displaying at least two images, either of unrelated or same content, along different directions on a single display such that the viewing windows or angular extends associated with each image are different or asymmetrical with respect to the normal of the display.

Another aspect of the present invention is to provide a dual-view/3D display having asymmetric viewing angles by introducing multiple sub-pixel pitches into a single panel of the display such that asymmetric viewing angles and therefore asymmetric viewing windows or zones can be realized.

Still another aspect of the present invention is to provide a dual-view/3D display having asymmetric viewing angles such that the asymmetric viewing windows can be achieved without affecting the outer viewing angles or outer viewing boundaries of the viewing windows.

According to one embodiment of the present invention, a dual-view/3D display device having asymmetric viewing angles comprises: a display panel including a color filter layer and a plurality of sub-pixels in a matrix form; wherein each of said plurality of sub-pixels is of a different sub-pixel pitch relative to its immediate adjacent sub-pixel to form multiple sub-pixel pitches on said display panel to realize the asymmetric viewing angles of the display device.

The foregoing summary recites the embodiment of the present invention for illustrative purposes. The embodiments may be implemented in various different ways, which shall also be considered as within the scope of the present invention. Details of the exemplary embodiments of the invention will be further described herein.

BRIEF DESCRIPTION OF THE DRAWINGS

The present invention may be embodied in various forms and the details of the embodiments will be described in the subsequent content with reference to the accompanying drawings. The drawings (not to scale) show and depict only the embodiments and shall not be considered as limitations to the scope of the present invention.

DESCRIPTION OF EMBODIMENTS OF THE INVENTION

The present invention is related to a dual-view/3D display having asymmetric viewing angles. The asymmetric viewing angles of the display device can be realized by the introduction of multiple sub-pixel pitches to a single display. In an embodiment, the primary left viewing window PL and the primary right viewing window PR of the display can be of different angular extends. The introduction of multiple sub-pixel pitches provides asymmetric viewing windows to different observers without affecting the outer boundaries or outer viewing angles of the viewing windows or images.

Figure 4:
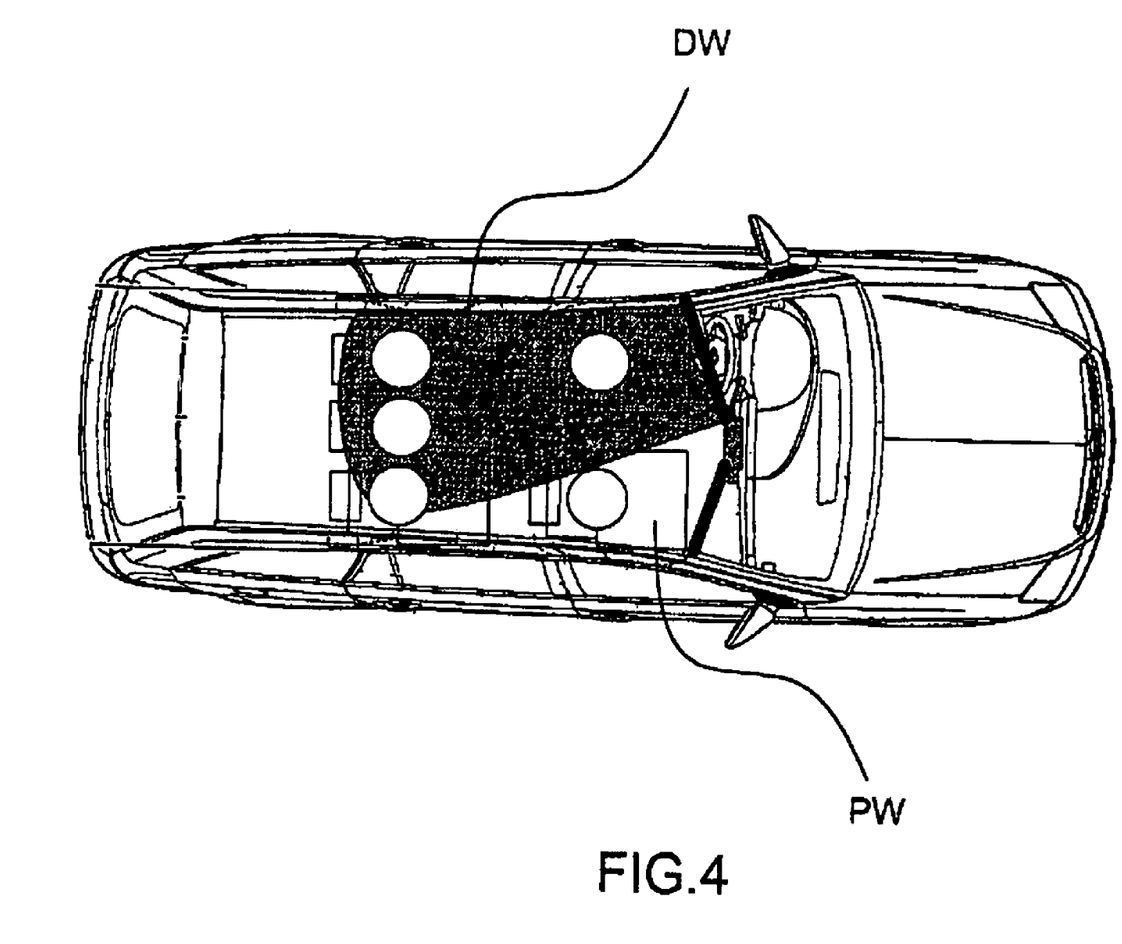
FIG. 4 shows a schematic top view of an asymmetric aligned display of the present invention used as a display in a motor car.

First, as a specific example to demonstrate the features of the present invention, FIG. 4 shows an explanatory embodiment of an asymmetric aligned display of the present invention applied in a motor car. As previously mentioned, in order to ensure the driver's safety during the driving, the driver should be limited to his or her own viewing window or zone, with the image content of for example, navigation information; whereas the passenger may have a viewing window with smaller angular extend displaying other image content such as video or movie. In the example as shown in the figure, the driver's viewing window DW (shaded area) is of an angular extend relatively greater than that of the passenger's viewing window PW such that the viewing angles are asymmetrical with respect to the normal of the display. Note that the asymmetric aligned display of the present invention can also be applied in many other applications as described herein.

For the purposes of illustration, the present invention will be described with reference to dual-view and 3D displays both being capable of displaying two images with their contents either unrelated or related to each other. The present invention, however, may be applied to display devices including LCD, OLED, AMOLED display. The present invention may also be applicable to a multi-view display capable of showing three or more images in different directions.

Figure 5:
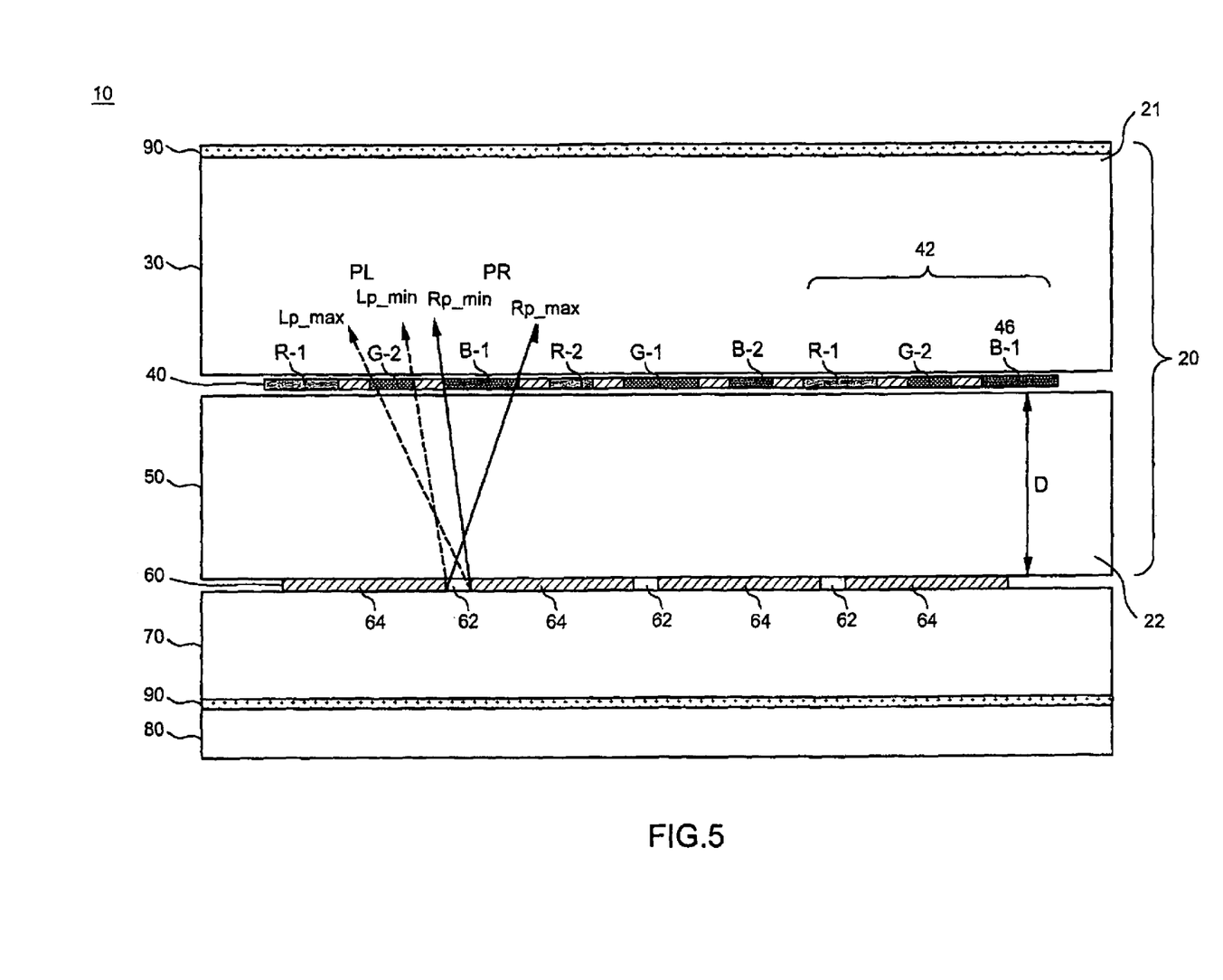
FIG. 5 shows a schematic side view of an embodiment of the dual-view/3D display of the present invention having asymmetric viewing angles.

In order to realize an asymmetric aligned display, applicable to a dual-view or 3D display, the present invention provides a technical solution by introducing multiple sub-pixel pitches to the display. FIG. 5 shows a schematic side view of an embodiment of a dual-view/3D display of the present invention. As shown in the figure, the dual-view/3D display device 10 having asymmetric viewing angles comprises a display panel 20 including a color filter layer 40 and a plurality of pixels 42 wherein each of the pixels 42 having a plurality of sub-pixels 46 arranged in a matrix; wherein each of the plurality of sub-pixels 46 is of a different sub-pixel pitch P1 or P2 (shown in FIG. 6) relative to its immediate adjacent sub-pixel to form multiple sub-pixel pitches on the display panel 20 such that the asymmetric viewing angles can be realized. The incident of light through the sub-pixels visible to an observer in front of the display device 10 is also shown to illustrate the corresponding primary left and right viewing windows or zones PR and PL, which will be described in detail later.

In one embodiment, the display panel 20 of the display device 10 further comprises a color filter/CF substrate 30 and a thin-film-transistor/TFT array liquid crystal substrate 50 with the color filter layer 40 sandwiched therebetween. As shown in the figure, in an embodiment, the CF substrate 30 is disposed near the front of the display device 10 or on top of the TFT array substrate 50; in another embodiment, the TFT array substrate 50 may be arranged above the CF substrate 30 to form the display panel 20. Polarizers 90 may also be provided on both the front and rear ends of the display panel 20. In an embodiment of a LCD display such as a transmissive, transreflective or reflective LCD display, a backlight system 80 may be attached at the rear end of the display panel 20 as one of the sources of light for the display device 10.

In an embodiment of the present invention, the dual-view/3D display device 10 further comprises at least one barrier 60 with interlaced transmissive and opaque regions 62 and 64 respectively where the barrier 60 is situated on one side of the display panel 20 a distance D away from the color filter layer 40. As shown in FIG. 5, in one embodiment, the barrier 60 is provided near the rear side 22 of the display panel 20 such that the light travels through the transmissive regions 62 of the barrier 60 before reaching the color filter layer 40. In another embodiment, the barrier may be provided near the front side 21 of the display panel 20 such that the light travels to the color filter layer 40 before passing through the transmissive regions 62 of the barrier 60. In yet another embodiment, both the front and rear sides 21, 22 of the display panel 20 may be provided with a barrier 60. The transmissive regions 62 of the barrier 60 permits visible light to pass therethrough and can be embodied as apertures or transparent films. The opaque regions 64 may be embodied as opaque or opaque films to block or reflect visible light shone thereon. In one embodiment, the opaque regions 64 may be further made reflective with any know light-reflective materials on the surface facing toward or opposite to a light source, such as the backlight system 80 in the case of a LCD display, to reflect light. As shown in the figure, the barrier 60 may be further supported on a barrier substrate 70 which may be of a transparent material such as glass. In a dual-view or 3D display, the barrier 60 can be designed in accordance with the desired focal length to direct the light passing therethrough and to direct images in different directions in conjunction with the display panel, in particular the color filter layer of the panel. Types of the barrier 60 will be further described in conjunction with the color filter layer and the sub-pixels in the later content.

With regard to the introduction of the multiple sub-pixel pitches into a display, in one embodiment, it can be realized by changing the width or size of the sub-pixels such that each sub-pixel has a sub-pixel pitch different from its adjacent sub-pixel or, to be more specific, its immediate adjacent sub-pixel. In other words, any two sub-pixels aligned adjacent to each other across a lateral row or a longitudinal column in a matrix on a display panel may have a different sub-pixel pitch or width from each other. Accordingly, in one embodiment, the sub-pixels of the display panel may be classified into at least two sets of sub-pixels in which a first sub-pixel set displaying a first image along a first direction (e.g., the driver side/direction of a motor car) is each of a first sub-pixel pitch P1; whereas a second sub-pixel set displaying a second image along a second direction different from the first direction (e.g., the passenger side of a motor car) is each of a second sub-pixel pitch P2 different from P1. In other words, in the case of a dual-view/3D display, each sub-pixel can be assigned to either a primary left viewing window PL of a first image in a first direction or a primary right viewing window PR of a second image in a second direction. The sub-pixel pitch of the sub-pixels associated with PL or the first image is different from that of the sub-pixels associated with PR or the second image. However, it can be understood that the sub-pixels may also be classified or categorized into three or more sets of sub-pixels displaying different images in various directions different from each other according to the design of the display or sub-pixels. The introduction of the multiple sub-pixel pitches of the present invention is also applicable to a multi-view display.

Figure 6:
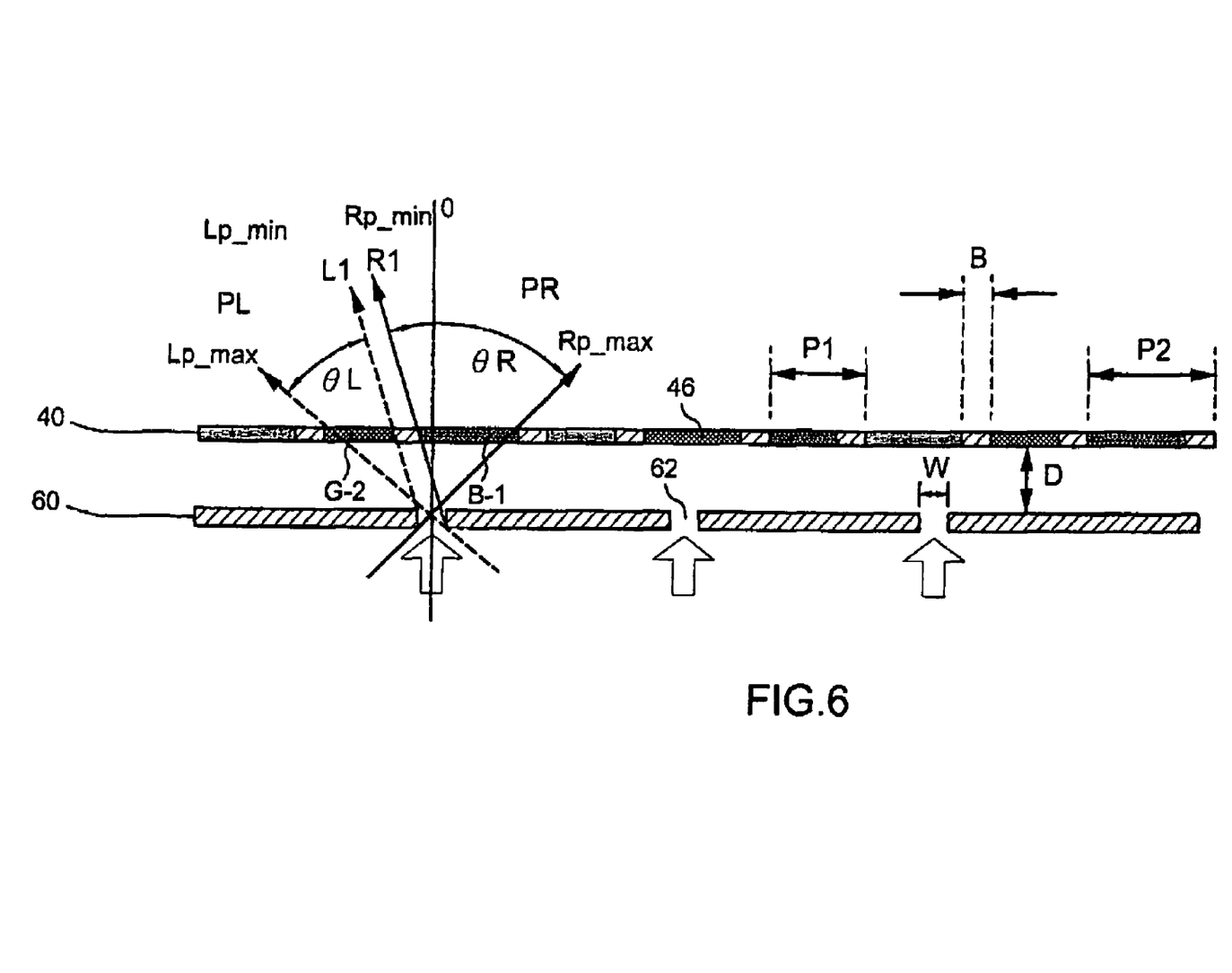
FIG. 6 shows a simplified schematic side view of the dual-view/3D display of the present invention of FIG. 4.

FIG. 6 shows a simplified schematic side view of an embodiment of the present invention. The color filter layer 40 includes a plurality of sub-pixels 46 in a matrix with each being assigned to a corresponding viewing window, for instance the abovementioned PL or PR of a dual-view/3D display. The barrier 60, which has transmissive region 62 with a width W, is situated at a distance D from the color filter layer 40. In definition, angles $Lp\_min$ and $Rp\_min$ may refer to the minimum viewing angles of said viewing windows PL and PR respectively and angles $Lp\_max$ and $Rp\_max$ may refer to the maximum viewing angles of PL and PR respectively. Therefore, the angular extends of the viewing windows of a dual-view/3D display of the present invention may generally be referred to as $\Theta L$ and $\Theta R$, or $|Lp\_max - Lp\_min|$ associated with the primary left view window PL and $|Rp\_max - Rp\_min|$ for the primary right view window PR, respectively. One of the key feature of the present invention is selecting different pitches P1 and P2 for the adjacent subcells of the color filter while maintaining the sum of P1 and P2 to be a constant throughout the display (P1+P2=a constant), or the sum of P1 and P2 is equal to twice the distance between the midpoints of a first sub-pixel having said sub-pixel pitch P1 and an adjacent second sub-pixel having said sub-pixel pitch P2. Furthermore, the values of P1 and P2 may be selected depending on the viewing angles or degree of asymmetry required.

In the illustrated embodiment, each sub-pixel 46 may have a sub-pixel pitch, such as the abovementioned P1 or P2, and is spaced apart from each other by a distance B. As shown in the figure, in one embodiment, a sub-pixel G-2 assigned to the primary left view window or zone PL can be of a sub-pixel pitch P1 which is smaller than the width or sub-pixel pitch P2 of an immediate adjacent sub-pixel B-1 assigned to the primary right view window PR. As shown in the figure, the outer viewing angles $Lp\_max$ and $Rp\_max$ of said viewing windows are maintained symmetrical, while the inner viewing angles $Lp\_min$ and $Rp\_min$ are substantially identical in degree (magnitude) and/or sign but shifted in the same direction. Therefore, $\Theta L < \Theta R$ when P1<P2, and a greater difference between the sub-pixel pitches (e.g., $|P1-P2|$) should yield a greater difference between the angular extends of the corresponding images or viewing windows (e.g., $||Rp\_max - Rp\_min| - |Lp\_max - Lp\_min||$ or $|\Theta L - \Theta R|$).

The comparison between an symmetric aligned display as shown in FIG. 2 and the explanatory embodiment of the asymmetric aligned display shown in FIG. 6 reflects the difference resulted from the introduction of multiple sub-pixel pitches of the present invention. In one embodiment, by making the sub-pixel G-2 having a smaller sub-pixel pitch P1 than that of an adjacent sub-pixel B-1 with sub-pixel pitch P2, asymmetric viewing angles of PL and PR associated with the pitches of P1 and P2 can be achieved.

Further detail can be given to the abovementioned outer viewing angles of the present invention in comparison to an asymmetric aligned display realized by barrier shift. In an embodiment where the at least one first viewing angle and the at least one second viewing angle may include outer viewing angles $Lp\_max$, $Rp\_max$ associated with different sub-pixel pitches P1 and P2, the outer viewing angles $Lp\_max$ and $Rp\_max$ of the viewing windows PL and PR can be maintained symmetrical as in the case of a symmetric aligned display. As the previous embodiment involving the barrier shift (FIG. 3) is compared based on the assumption that design parameters such as B, W and D are maintained, the angles La_max and Ra_max in FIG. 3 are also shifted and tilted to become asymmetrical. In other words, as La_max is larger than Ra_max due to the barrier shift, the outer boundaries of the viewing windows PL, PR are unfavorably affected. Unlike the embodiment realized by the barrier shift, the outer viewing angles, Lp_max and Rp_max shown in FIG. 6 can still be maintained substantially the same in magnitude but in different sign (such as to the left and right) with respect to the normal 0, leaving the outer boundaries of the PL and PR symmetrical or unaffected.

In an embodiment of the present invention, the sub-pixels of different sub-pixel pitches may be arranged in an alternate fashion across the display panel. As shown in FIGS. 5 and 6, in the embodiment where at least two sub-pixel pitches exist in a single panel, the first sub-pixel set corresponding to the first sub-pixel pitch P1 and sub-pixels of the second sub-pixel set corresponding to the second sub-pixel pitch P2 may be arranged alternately in a row across the display panel. By way of an illustrative example, the sub-pixels of R-1 is of a sub-pixel pitch P1, G-2 is of a sub-pixel pitch P2 and B-1 is of sub-pixel pitch P1 and so forth in a row as shown in the figure. Further, each row of the matrix may have different arrangement of the sub-pixels with different sub-pixel pitches such that the alignment of the monochromes of the sub-pixel and their sub-pixel pitches may all be different across a lateral row or a longitudinal column.

In another embodiment of the present invention, the sub-pixels having similar sub-pixel pitches may be aligned to form columns across the matrix. For instance, columns of different sub-pixel pitches may be alternately arranged across the display panel. As shown in FIGS. 5 and 6, in the embodiment where at least two different sub-pixel pitches exist in a single panel, the display panel may include columns of the sub-pixels of the first sub-pixel set having said sub-pixel pitch P1 and of the second sub-pixel set having said second sub-pixel pitch P2 in a longitudinal direction across the display panel to form alternate columns of the first sub-pixel set and the second sub-pixel set across the display panel.

In any one of the abovementioned embodiments, each of the sub-pixels can be of any one of the RGB monochromes. In one embodiment, as the sub-pixels of at least two sets of different sub-pixels pitches (e.g., P1 and P2) are arranged alternately across the lateral rows on an asymmetrical display panel, such as R-1, G-2, B-1, R-2, G-1, B-2, the sub-pixels having similar sub-pixel pitches can be assigned to either the primary left viewing window PL or the primary right viewing window PR. Therefore, a set of alternate sub-pixels, such as R-1, G-1 and B-1 or R-2, G-2 and B-2, may form any one of the pixels of the images displayed in the respective viewing window PL or PR.

Figure 7:
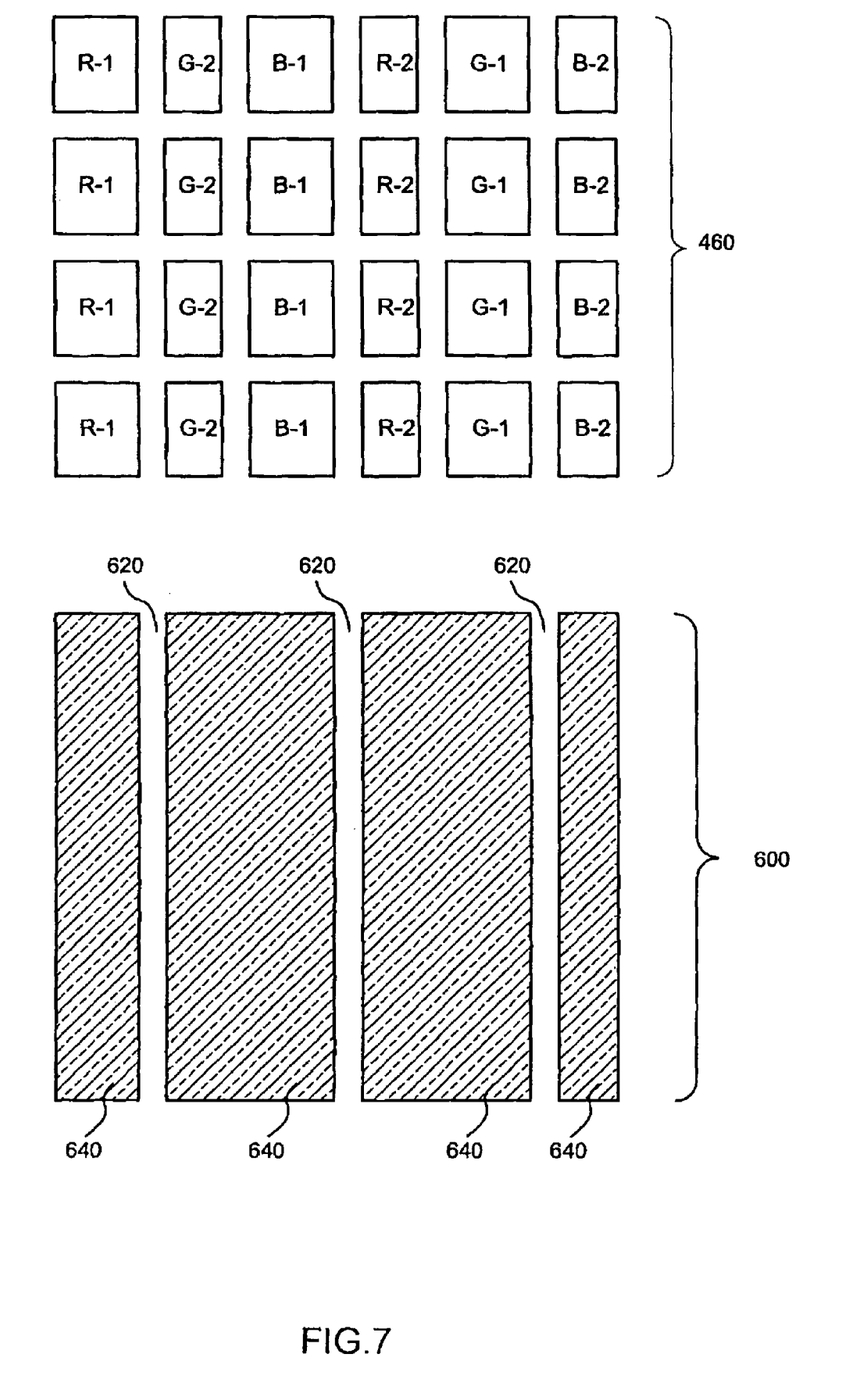
FIG. 7 shows a schematic front view of an embodiment of a straight barrier of the dual-view/3D display of the present invention having asymmetric viewing angles.

The barrier, such as the barrier 60 shown in FIG. 5, of the asymmetric aligned display of the present invention may be embodied in different structures so that images can be displayed in different directions. As previously described, a barrier may be disposed on either the front, the rear or both the front and the rear sides of the display. Furthermore, FIG. 7 shows a schematic front view of an embodiment of the present invention in which a straight barrier 600 is applied on one side (e.g., front side) of the display. The sub-pixels 460 of R-1, G-2, B-1, R-2, G-1 and B-2 shown as part of a color filer layer o are each with a different sub-pixel pitch P1 or P2. In the embodiment as shown, the association of sub-pixels with first sub-pixel pitch P1 or the second sub-pixel pitch P2 are denoted by the symbol of -1 or -2 respectively. The P1 and P2 also correspond to the primary left viewing window PL and the primary right viewing window PR, respectively. As shown in FIG. 7, P1 may be of a size or width greater than P2. As the sub-pixels of P1 and P2 are aligned alternately in columns across the display panel, the straight barrier 600 may have its transmissive and opaque regions 620, 640 interlaced alternately in a longitudinal direction in accordance with arrangement of the sub-pixels 460 having different sub-pixel pitches P1 and P2. Through the barrier 600, in particular the transmissive regions 620, the sub-pixels (e.g. R-1, B-1 and G-1) associated with P1 may form any one of the pixels constituting an image displayed in the primary left viewing window PL; and likewise, the sub-pixels (e.g. G-2, R-2 and B-2) with P2 may form any one of the pixels of another image displayed in the primary right viewing window PR. As the sub-pixel pitches P1 and P2 associated with the PL and PR viewing windows are of different width or size, the asymmetric viewing angles of the display can be realized such that the angular extends of PL and PR are different from each other.

Figure 8:
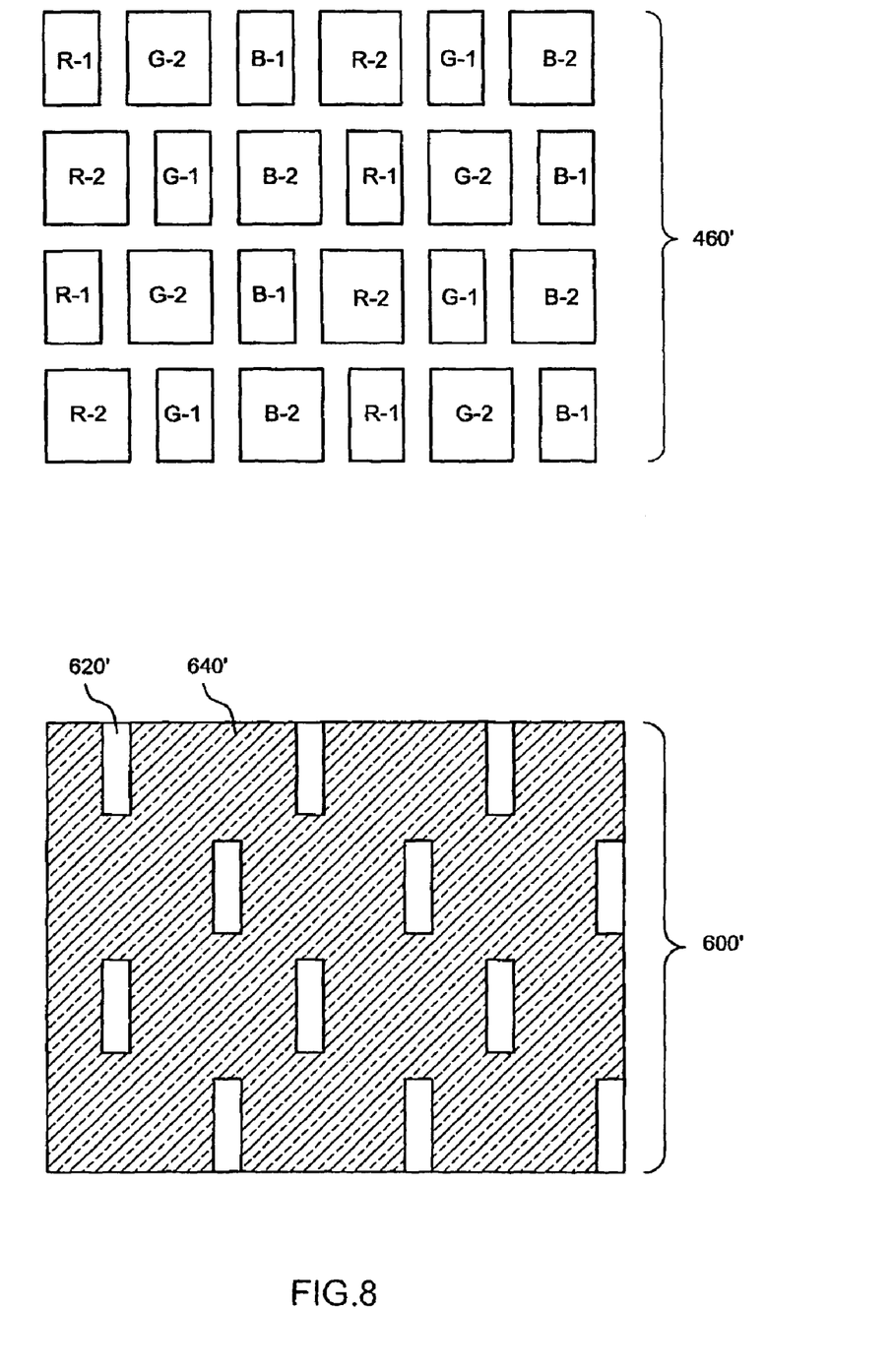
FIG. 8 shows a schematic front view of an embodiment of a stepped barrier of the dual-view/3D display of the present invention having asymmetric viewing angles.

FIG. 8 shows another embodiment of the barrier of the present invention where a stepped barrier 600' may be placed on one side (e.g., front side) of a display panel comprising a plurality of sub-pixels 460'. In one embodiment, as the sub-pixels 460' of different sub-pixel pitches, such as P1 and P2, are arranged alternately across both rows and columns in lateral and longitudinal directions as shown in the figure, a stepped barrier 600' with its transmissive 620' and opaque regions 640' constructed to alternate in rows and columns can be applied to display images in different viewing windows PL and PR along different directions. An image created by the sub-pixels of R-1, B-1 and G-1 across the rows and columns can be displayed in the PL viewing window; whereas the PR viewing window may have another image created by the combination of sub-pixels G-2, R-2 and B-2 in rows and columns of the sub-pixel matrix. As the sub-pixel pitches P1 and P2 associated with the PL and PR viewing windows are of different width or size, the asymmetric viewing angles of the display can be realized such that the angular extends of PL and PR are different from each other, in particular as mentioned above.

The present invention is applicable to various types of displays. According to an embodiment of the present invention, the display panel may be a liquid crystal display (LCD) comprising a liquid crystal layer. In another embodiment, the display panel may be an organic light-emitting display (OLED) comprising a electroluminescent layer with organic compounds. In the case of a liquid crystal display, a backlight system may be further provided on a rear side of the display panel as one of the light sources. As far as the structure of the display panel is concerned, note that the data lines of a display can be laid within the abovementioned separation of sub-pixels or parameter B (FIGS. 5 and 6), which may also refer to the width of the black matrix in a color filter layer.

While the present invention is disclosed in reference to the embodiments or examples detailed above, it is to be understood that these embodiments or examples are intended for illustrative purposes, which shall not be treated as limitations of the present invention. For instance, the present invention can be applied to a dual-view/3D display, however, the term "dual-view/3D display" recited includes any display device capable of generating at least two images that may be of unrelated or related content in general; the introduction of the multiple sub-pixel pitches of the present invention may also be applied in multi-view displays. Furthermore, the term "a", "an" or "one" recited above and in the claims is of the meaning equivalent to "at least one". It is contemplated that modifications and combinations will readily occur to those skilled in the art, which modifications and combinations will be within the spirit of the invention and the scope of the following claims.

What is claimed is:

1. A display device having asymmetric viewing angles, comprising:
    a display panel including a plurality of sub-pixels arranged in a matrix form having a plurality of rows and columns;
    wherein each of said plurality of sub-pixels is of a different sub-pixel pitch relative to its immediate adjacent sub-pixel to form multiple sub-pixel pitches on said display panel to realize asymmetric viewing angles of the display device; and
    a barrier having interlaced transmissive and opaque regions disposed at one side of the display panel a distance away from the sub-pixels;
    wherein the sub-pixels include a set of first sub-pixels of red, green and blue colors respectively having a first sub-pixel pitch, and a set of second sub-pixels of red, green and blue colors respectively having a second sub-pixel pitch different from the first sub-pixel pitch, the first sub-pixels of the first sub-pixel pitch being alternated with the second sub-pixels of the second sub-pixel pitch along each of the rows and each of the columns, and each pair of adjacent first and second sub-pixels in each of the rows are of different colors,
    wherein the first sub-pixels are configured to display a first image along a first direction, and the second sub-pixels are configured to display a second image along a second direction different from the first direction, and
    wherein the sum of the first sub-pixel pitch and the second sub-pixel pitch is equal to twice the distance between the midpoints of one first sub-pixel and one second sub-pixel adjacent thereto.

2. The display device as claimed in claim 1, wherein each of the opaque regions is reflective towards a backlight side.

3. The display device as claimed in claim 1 wherein the asymmetric viewing angles of the display device include a first viewing angle corresponding to the first sub-pixels of the first sub-pixel pitch and a second viewing angle corresponding to the second sub-pixels of the second sub-pixel pitch, a first angular extent associated with said first viewing angle is different from a second angular extent associated with said second viewing angle.

4. The display device as claimed in claim 3, wherein said first viewing angle includes an outer viewing angle corresponding to the first sub-pixel pitch and said second viewing angle includes an outer viewing angle corresponding to the second sub-pixel pitch.

5. The display device as claimed in claim 4, wherein said outer viewing angle corresponding to the first sub-pixel pitch is substantially equivalent to said outer viewing angle corresponding to the second sub-pixel pitch in magnitude.

6. The display device as claimed in claim 3, wherein said first viewing angle includes an inner viewing angle corresponding to the first sub-pixel pitch and said second viewing angle includes an inner viewing angle corresponding to the second sub-pixel pitch.

7. The display device as claimed in claim 6, wherein said inner viewing angle corresponding to the first sub-pixel pitch is substantially equivalent to said inner viewing angle corresponding to the second sub-pixel pitch in both magnitude and in sign.

8. The display device as claimed in claim 1, wherein a difference between the first angular extent of the first image along the first direction and the second angular extent of the second image along the second direction correlates with a difference between the first sub-pixel pitch and the second sub-pixel pitch.

9. The display device as claimed in claim 6, wherein a greater difference between the first and second sub-pixel pitches yields a greater difference between the first and second angular extents of the first and second images.

10. The display as claimed in claim 1, wherein the display panel includes a color filter layer, and said barrier is provided near a rear side of the display panel such that light travels through the transmissive regions of the barrier before reaching the color filter layer.

11. The display device as claimed in claim 1, wherein the display panel includes a color filter layer, and said barrier is provided near a front side of the display panel such that light travels to the color filter layer before passing through the transmissive regions of the barrier.

12. The display device as claimed in claim 1, wherein the barrier is a straight barrier.

13. The display device as claimed in claim 1, wherein the barrier is a stepped barrier.

14. The display device as claimed in claim 1, wherein the display panel comprises a liquid crystal layer.

15. The display as claimed in claim 1, wherein the display panel comprises an electroluminescent layer with organic compounds.

* * * * *